June 26, 1923.
C. F. BRACHT
BROOD SOW MUZZLE
Filed July 15, 1920
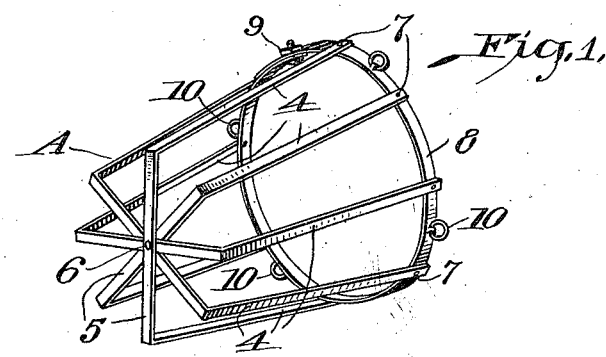
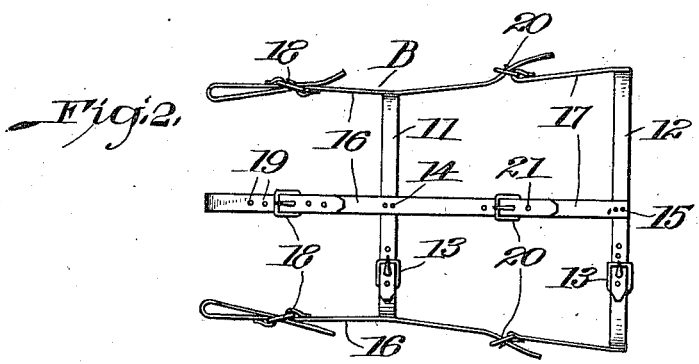
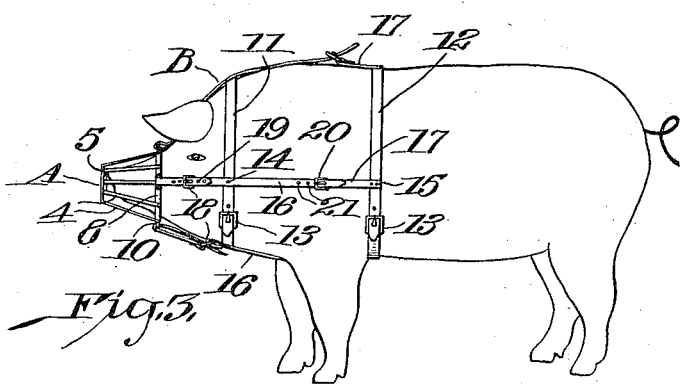
Inventor:
Carl F. Bracht
Frank Fuller
atty.

Patented June 26, 1923.

1,459,904

UNITED STATES PATENT OFFICE.

CARL F. BRACHT, OF TWIN BROOKS, SOUTH DAKOTA.

BROOD-SOW MUZZLE.

Application filed July 15, 1920. Serial No. 396,623.

*To all whom it may concern:*

Be it known that I, CARL F. BRACHT, a citizen of the United States, residing at Twin Brooks, in the county of Grant and State of South Dakota, have invented a new and useful Improved Brood-Sow Muzzle, of which the following is a description.

This invention relates to a muzzel to be worn by a sow or other animal to primarily prevent eating of her young, and poultry without interfering with drinking and usual eating.

The invention aims to provide a novel securing means for association with one or more of the legs of the animal.

Another desirable object is to provide a novel adjustable securing means as will be hereinafter pointed out.

Additional objects and advantages will appear from the following description taken in connection with accompanying drawings of one practical embodiment.

In said drawings:—

Fig. 1 is a perspective view of the muzzle member.

Fig. 2 is a plan view of the attaching harness, and

Fig. 3 is a view showing the complete device in side elevation worn by a sow as in actual use.

Referring specifically to the drawings wherein like reference characters designate like or similar parts, a muzzle A is provided which may be shown like the skeleton form, best shown in Fig. 1. It may comprise a plurality of metallic strips or bars of substantially U shape, having arms on the sides 4 and bridges 5 joined midway of their ends by a rivet or other fastening 6. The terminals of arms 4 are riveted or otherwise secured at 7 to a metallic ring or frame 8 in the form of a band having overlapping ends secured together as by means of a bolt 9. In order that a mounting harness B may be secured to the muzzle A, eyelets or the like 10 are mounted on frame 8.

The harness B may comprise straps of bands 11 and 12 of leather or other flexible material for the disposition respectively around the head and around the body in the rear of the front legs of the animal as shown in Fig. 3. Suitable adjustable buckles 13 are provided to connect the ends of bands 11 and 12 and permit adjustment of such bands according to the size of the animal fitted. Secured to the bands 11 and 12 as by rivets 14 and 15 are leather or other flexible straps comprising sections 16 and 17. Sections 16 extend in front of band 11 and are passed through the eyelets 10 and secured therein by buckles 18 cooperating with openings 19 in such sections to permit of adjustable connections. Sections 17 may have buckles 20 to cooperate with openings 21 in sections 16 to permit of an adjustable connection between them.

It will be noted that in use strap 12 prevents displacement of the muzzle A from the head and that by reason of the adjustable buckle connections of the different straps the device may be removably and adjustably secured to animals of different sizes.

Undue turning of the muzzle relatively to the head is prevented by the disposition of one strap 12—17 between the front legs and another between the ears.

Sufficient space is provided between the straps of the muzzle to enable the animal to drink and eat grain or swill. However the straps are sufficiently close to guard against intake of large objects like the animal's young or poultry.

I claim:—

A muzzle for the purpose specified having an attaching harness consisting of spaced straps, buckles to adjustably secure the straps in endless formation, sectional straps in crossing said straps secured thereto and having adjustable buckle connection, for the sections arranged intermediate the first straps, and the second straps having portions projecting beyond one of the first straps to mount the muzzle and buckles to secure the free ends of said portions located on the portions at a distance from the free ends.

CARL F. BRACHT.